(12) United States Patent
Sharp

(10) Patent No.: US 6,658,273 B1
(45) Date of Patent: Dec. 2, 2003

(54) CORDLESS LIGHT SYSTEM

(76) Inventor: Jeff D. Sharp, 427 S. Miller, Mesa, AZ (US) 85204

( * ) Notice: Subject to any disclaimer, the term of this patent is extended or adjusted under 35 U.S.C. 154(b) by 286 days.

(21) Appl. No.: 09/586,508

(22) Filed: Jun. 2, 2000

(51) Int. Cl.$^7$ ................................. H04Q 7/20
(52) U.S. Cl. ............... 455/575; 455/550; 455/566; 343/702
(58) Field of Search ................. 455/90, 550, 575, 455/566; 379/428.01, 433.01; 343/702, 721; 345/102; 349/61–63; 340/815.42

(56) References Cited

U.S. PATENT DOCUMENTS

| | | | | |
|---|---|---|---|---|
| 2,473,981 A | * | 6/1949 | Wood | 343/721 |
| 4,039,894 A | * | 8/1977 | Gardner, III | 315/76 |
| 4,100,547 A | * | 7/1978 | Cooke | 343/721 |
| 5,530,632 A | * | 6/1996 | Shikano et al. | 362/109 |
| 5,867,795 A | * | 2/1999 | Novis et al. | 455/566 |
| 5,901,206 A | * | 5/1999 | Soon | 379/110.01 |
| 6,181,284 B1 | * | 1/2001 | Madsen et al. | 343/702 |
| 6,215,984 B1 | * | 4/2001 | Figueras et al. | 455/575.7 |
| 6,254,249 B1 | * | 7/2001 | Kim et al. | 362/109 |
| 6,262,686 B1 | * | 7/2001 | Delarminat et al. | 343/721 |
| 6,285,893 B1 | * | 9/2001 | Keirinbou | 455/575.7 |
| 6,327,484 B1 | * | 12/2001 | Mathew | 455/575.7 |
| 2001/0041603 A1 | * | 11/2001 | Auten et al. | 455/572 |

* cited by examiner

*Primary Examiner*—William Trost
*Assistant Examiner*—Sharad Rampuria
(74) *Attorney, Agent, or Firm*—Schmeiser, Olsen & Watts

(57) ABSTRACT

An apparatus includes a cordless electronic device and a power source. A light source is mounted on the electronic device and is electrically connected to the power source. An on/off switch is also connected to the light source. The light source directs light away from the electronic device without passing such light through an information display screen. The power source may or may not include the power source for the electronic device, but it is typically a battery. In one embodiment the light source includes a fiber optic lead directing light from an information display light source of the electronic device. Preferably the electronic device is a cordless telephone, but it may be some other type of electronic device. In one embodiment, a portion of the light source is mounted on an antenna of the cordless telephone so that it can easily be directed by a user of the telephone. The apparatus may include multiple light sources where one light source is a laser light source and the other light source is a non-laser light source.

22 Claims, 7 Drawing Sheets

CORDLESS LIGHT SYSTEM

BACKGROUND OF THE INVENTION

1. Technical Field

This invention generally relates to cordless electronic devices, and more specifically relates to a light system for a cordless electronic devices.

2. Background Art

Flashlights and laser pointers are common items that are useful in a variety of situations. For example, flashlights are often convenient and useful during walks in the dark, when entering a car in the dark, or during power outages. Flashlights also provide additional safety during such situations. Laser pointers are often useful in indicating the position of relevant subject matter while giving large group presentations, or even in indicating the position of relevant subject matter during a conversation. However, carrying flashlights and laser pointers during daily activities is inconvenient.

DISCLOSURE OF INVENTION

Therefore, there existed a need to provide a convenient and reliable source of light that would not require the user to carry additional items. According to the present invention, an apparatus includes a cordless electronic device and a power source. A light source is mounted on the electronic device and is electrically connected to the power source. An on/off switch is also connected to the light source. The light source directs light away from the electronic device without passing such light through an information display screen.

The power source may or may not include the power source for the electronic device. In one embodiment, the light source includes a fiber optic lead directing light from an information display light source of the electronic device. Preferably the electronic device is a cordless telephone, but it may be some other type of electronic device. In one embodiment, a portion of the light source is mounted on an antenna of the cordless telephone so that it can easily be directed by a user of the telephone. The apparatus may include multiple light sources where one light source is a laser light source and the other light source is a non-laser light source.

The embodiments described above provide a convenient and reliable source of laser and/or non-laser light by incorporating laser and/or non-laser light sources into a conventional cordless electronic device. Such light sources are particularly useful in cordless telephones because many people currently carry their cordless telephones almost everywhere they go. Accordingly, they will have a laser pointer and/or a flashlight in almost any situation where these light sources might be needed.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements.

MODES FOR CARRYING OUT THE INVENTION

Figure 1:
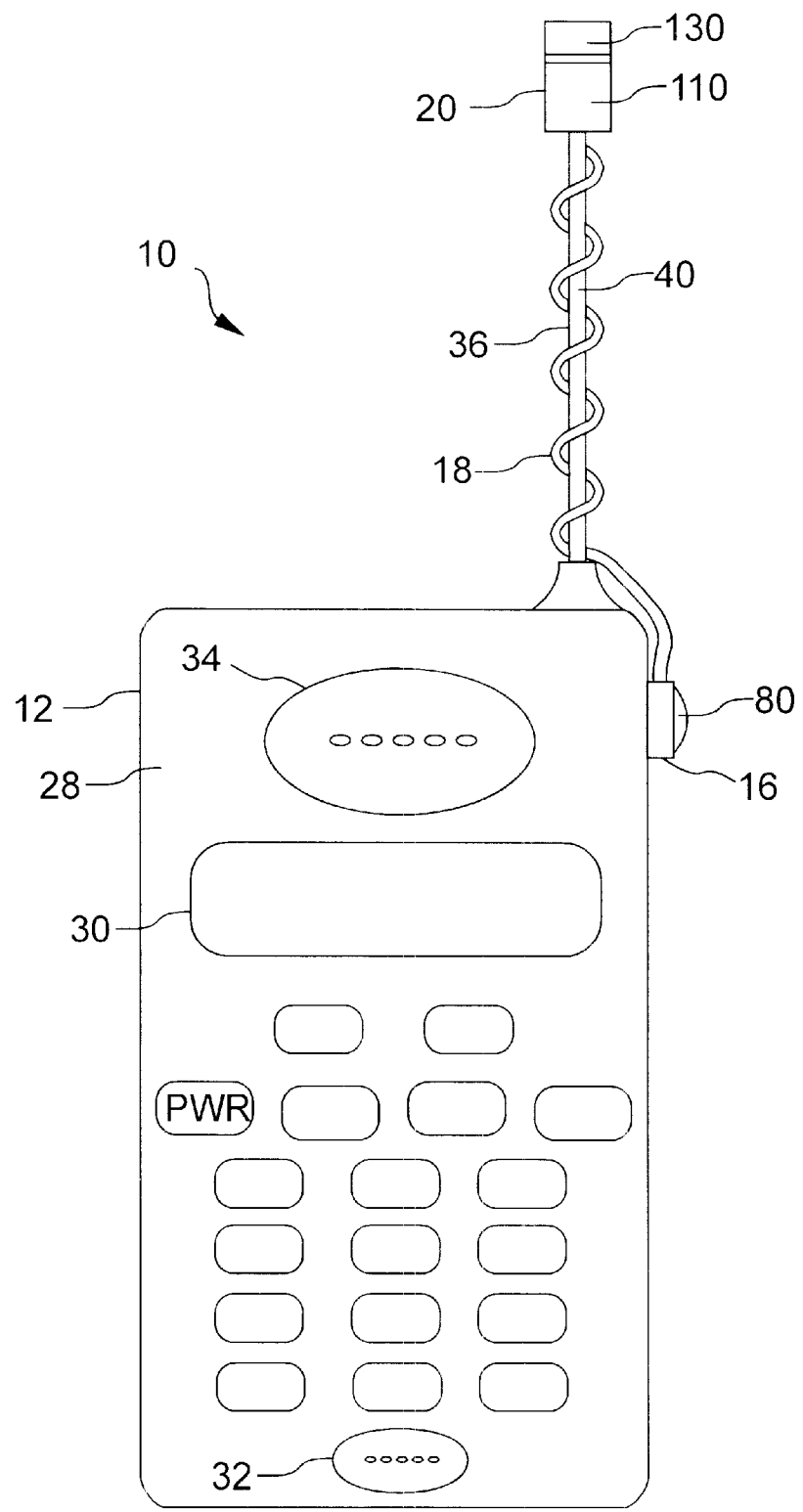
FIG. 1 is a front plan view of an embodiment of the present invention.
Figure 2:
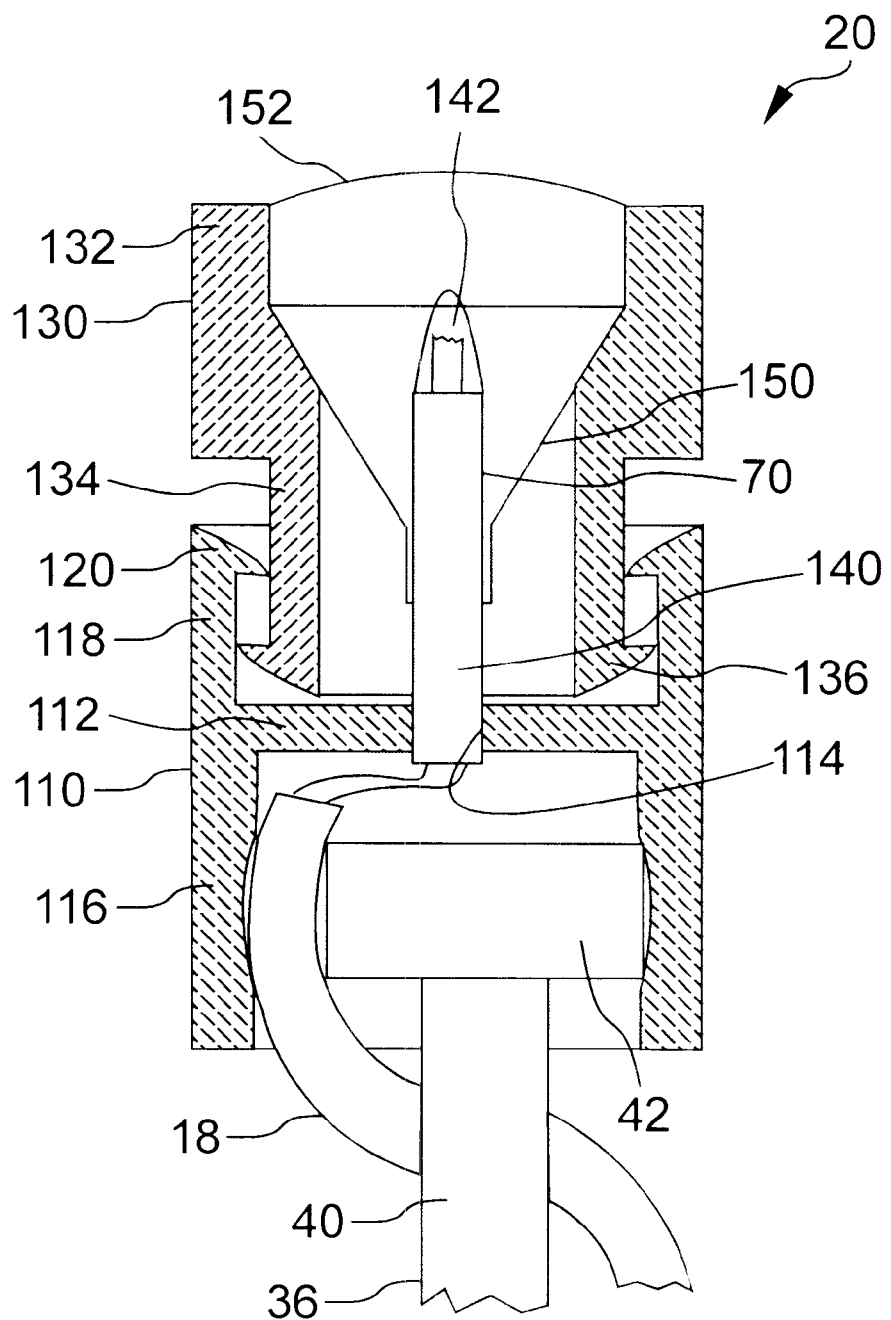
FIG. 2 is a partial cross sectional view of a light source according to the embodiment of FIG. 1.
Figure 3:
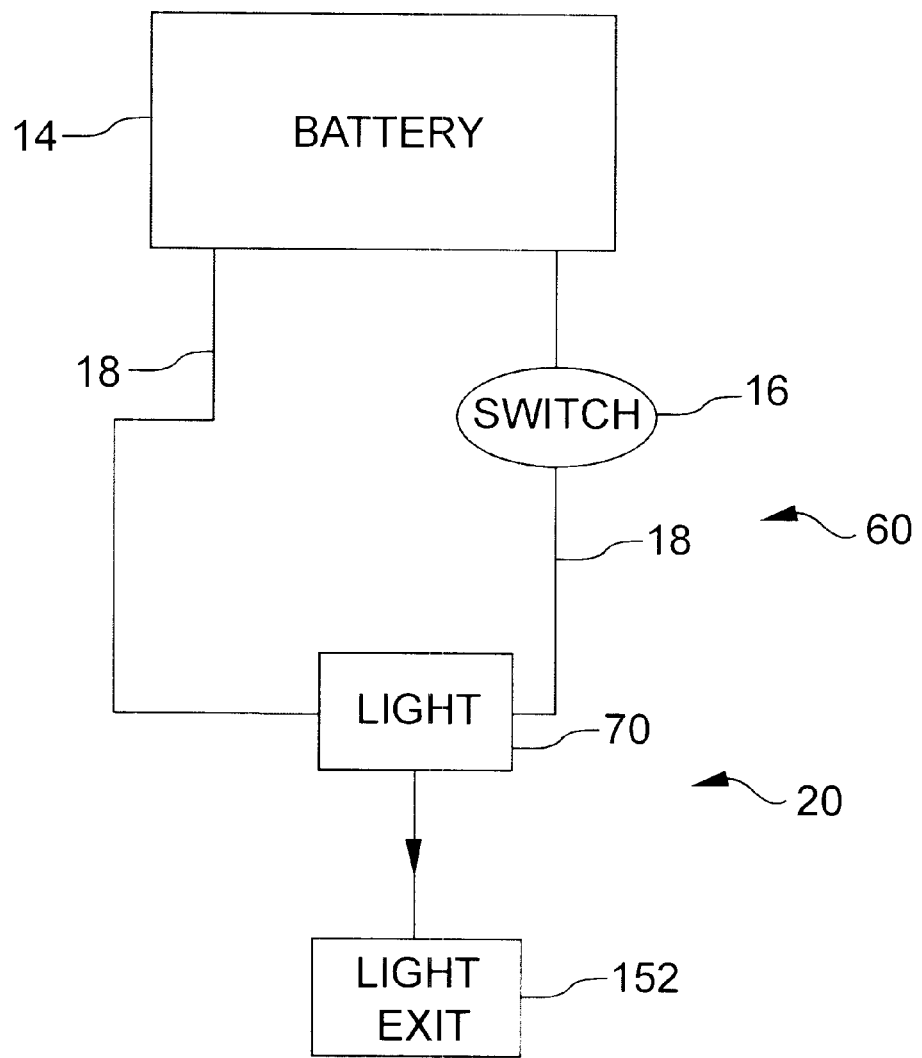
FIG. 3 is a schematic view of the light source, switch, and battery according to the embodiment of FIG. 1.
Figure 4:
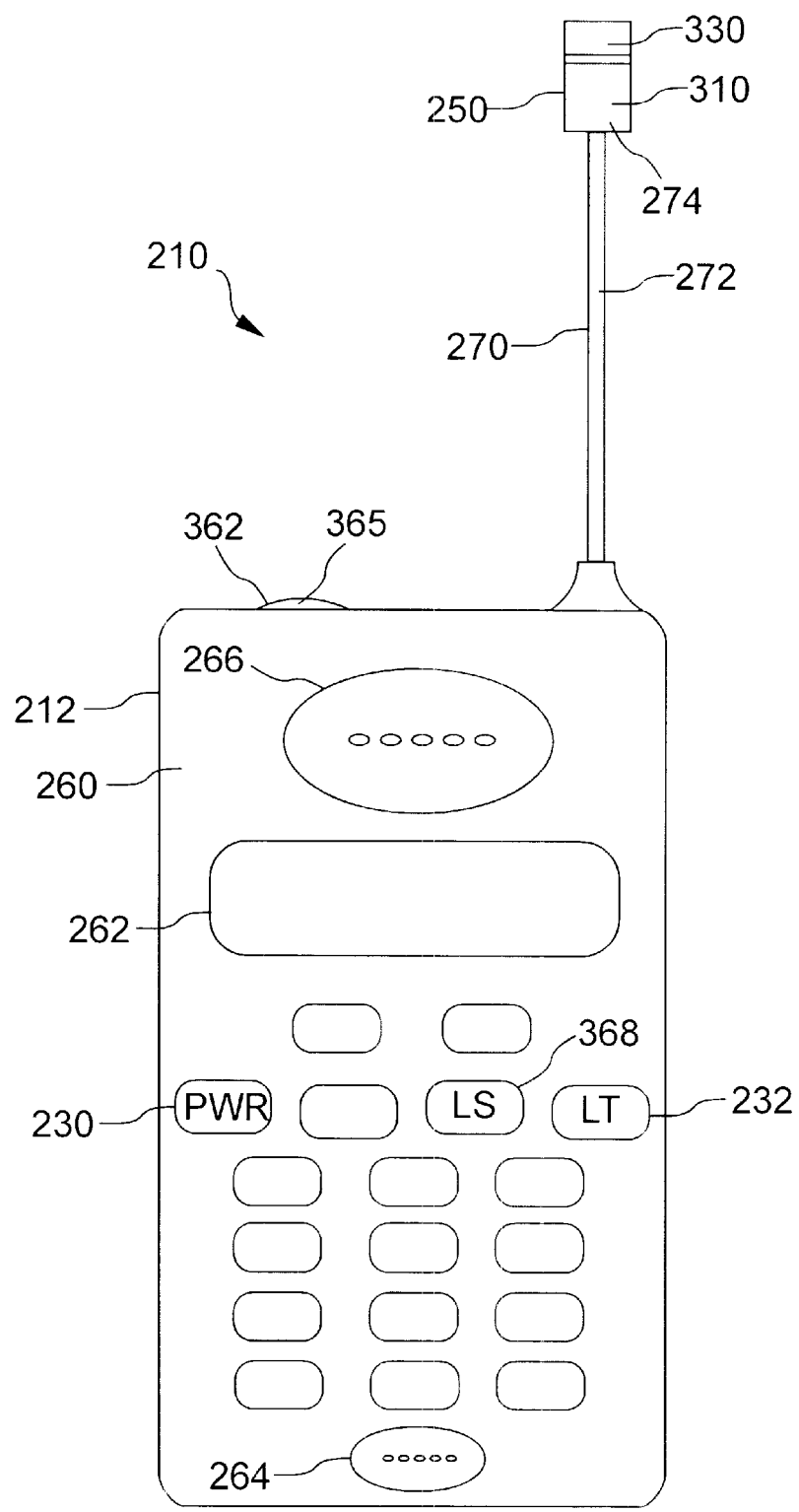
FIG. 4 is a front plan view of an embodiment of the present invention.

Referring to FIGS. 1–3, apparatus 10 generally includes a cordless telephone 12. A power source or battery 14 is mounted on telephone 12 and an on/off switch 16 is connected to battery 14. Electrical leads 18 extend from battery 14, through on/off switch 16 and to a light source 20. When switch 16 is in an on position, power from battery 14 activates light source 20 and light (preferably light in the visible spectrum) is emitted from light source 20. Thus, apparatus 10, in addition to being a telephone is also a source of light.

Referring now to FIG. 1 and describing apparatus 10 in more detail, telephone 12 may be any type of telephone that is able to operate without being attached directly to an external power source. As shown, telephone 12 includes a case 28. An information display screen or display 30, a microphone 32, a speaker 34, and an antenna 36 are all mounted on case 28. Antenna 36 preferably includes a shaft 40 that extends upwardly from case 28 and a knob 42 extending radially outwardly from a terminus of shaft 40 distal from case 28 (see FIG. 2). The present invention will also provide advantageous results in combination with other cordless electronic devices, such as pagers and pocket planners.

Battery 14 is not shown in FIG. 1, but it is seated within switch 16. Battery 14 may be any of several known types of batteries, and is preferably a battery of the type commonly used for watches, hearing aids, and calculators such as a 1.5 volt silver-oxide battery available from Radio Shack, a division of Tandy Corporation. However, it may be some other type of battery, such as the 3 volt lithium cell battery sold under the trademark THIN CELL by Ultralife Batteries Inc. located in Newark, N.Y. Referring now to FIG. 3, a circuit 60 includes battery 14, switch 16, electrical leads 18, and a light 70. Referring to FIG. 1, switch 16 preferably includes a button 80 that may be depressed to successively close or open a circuit 60 between light source 20 and battery 14, thereby activating light 70. As an example, if the battery is a 1.5 volt watch and calculator battery, the switch may be a tact switch sold under the stock number 900 5882 by Radio Shack, a division of Tandy Corporation. The operation and manufacture of such switches are well known to those skilled in the art.

Referring now to FIG. 2, light source 20 includes light 70 that is preferably fixed within stationary housing 110. Stationary housing 110 preferably includes a radial wall 112 that defines an aperture 114. A lower circumferential wall 116 extends downwardly from a periphery of radial wall 112 and encompasses electrical leads 18 and knob 42 of antenna 26 to secure stationary housing 110 to antenna 36. An upper circumferential wall 118 extends upwardly from the periphery of radial wall 112 and terminates in an inwardly-facing annular hook or engaging member 120. Stationary housing 110 is preferably made from a high density foam or other resilient material. In a preferred embodiment, stationary housing is made from a polyurethane foam such as is commonly used in truck and tractor seats and in church kneeling pads.

Light source 20 also includes a tubular mobile housing 130 that includes an upper circumferential wall 132 and a lower circumferential wall 134. Upper circumferential wall 132 preferably has a larger outer radius than does lower circumferential wall 134. Lower circumferential wall 134 terminates in an outwardly-facing annular hook or engaging member 136 that is below inwardly-facing annular hook 120. Preferably, the outer diameter of outwardly-facing annular hook 136 is slightly larger than the inner diameter of upper circumferential wall 118 of stationary housing 110, and the inner diameter of inwardly-facing annular hook 120 is slightly smaller than the outer diameter of lower circumferential wall 134 of mobile housing 130 so as to create an interference fit between stationary housing 110 and mobile housing 130. Mobile housing 130 is preferably made from a stiff material such as a stiff polymer or metal, but it may be made from a resilient material such as high density foam.

Light source 20 also includes a light 70 having a lower end 140 that is fixed within aperture 114 of stationary housing 110. Light 70 is preferably a light such as a 2 volt white light. Light 70 may be fixed within aperture 114 by an adhesive or other suitable fastener. An upper end 142 of light 70 includes a bulb that emits light when it is activated. Electrical leads 18 are attached to lower end 140 of light 70 and provide electricity to activate light 70. A reflector 150 and a lense or exit 152 are mounted within upper circumferential wall 132 of mobile housing 130. Light 70 extends upwardly through an opening in reflector 150 so that upper end 142 of light 70 is located above or within reflector 150.

Referring to FIGS. 1–3, battery 14, switch 16, electrical leads 18, and light source 20 are preferably sold separately from telephone 12. A user can easily assemble apparatus 10 by mounting switch 16 on a case 28 of telephone 12 (such as by an adhesive), wrapping electrical leads 18 around shaft 40 of antenna 36 and forcing stationary housing 10 over knob 42 of antenna 36. Preferably stationary housing 110 forms a tight fit with knob 42 so that it will remain stationary relative to antenna 36. It should be noted that switch 16 and light source 20 may be mounted in some other manner on telephone 12, and that light source 20, although shown as a non-laser light source may be a laser light source.

In operation, a user depresses button 80 of switch 60 to close circuit 60 and activate light 70 of light source 20. Light 70 then emits light from upper end 142. The light is directed by reflector 150 through lense or exit 152. To adjustably focus the emitted light, a user moves mobile housing 130 upwardly or downwardly, thereby moving reflector 150 and lense 152 relative to upper end 142 of light 70. To deactivate light 70 of light source 20, a user depresses button 80.

Referring now to FIGS. 4–7, in an alternative embodiment, an apparatus 210 generally includes a cordless telephone 212. A power source or battery 214 is mounted on telephone 212. A light circuit 220 connects battery 214 to a display light 222 by electrical leads 224. Light circuit 220 preferably includes a main power switch 226 and a light switch 228 arranged in parallel. Main power switch 226 is preferably connected to a power button 230 so that depressing power button 230 closes and opens main power switch 226. Preferably, battery 214 powers telephone 212 and power button 230 is also the power button for operation of telephone 212. Light switch 228 is preferably connected to a light button 232 so that depressing light button 232 closes and opens light switch 228. Thus, light circuit 220 will be closed and display light 222 will be activated if main power switch 226, light switch 228, or both are closed (in the on position).

Figure 5:
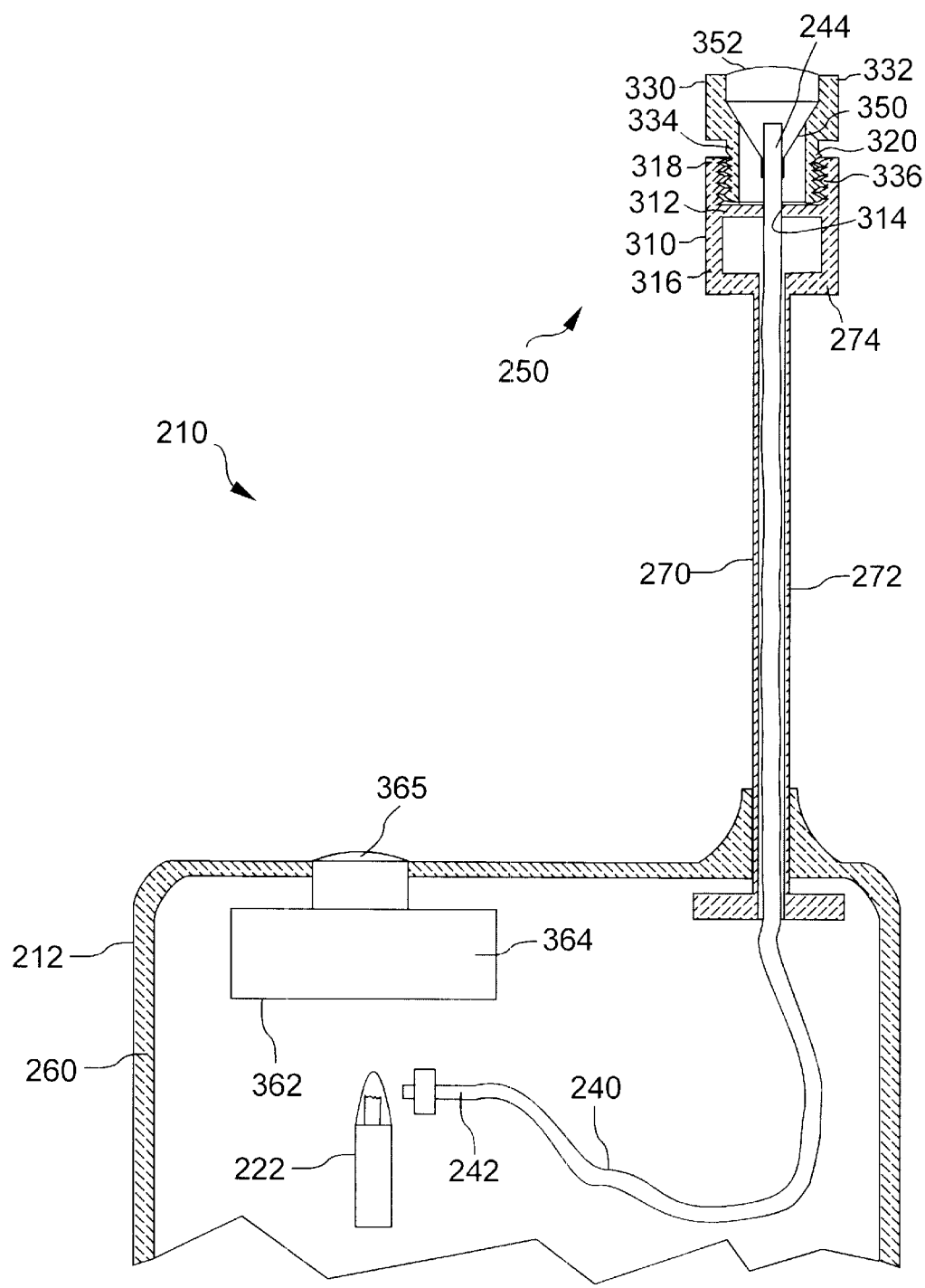
FIG. 5 is a partial cross sectional view of a portion of the embodiment of FIG. 4 with the cordless telephone antenna extended.
Figure 6:
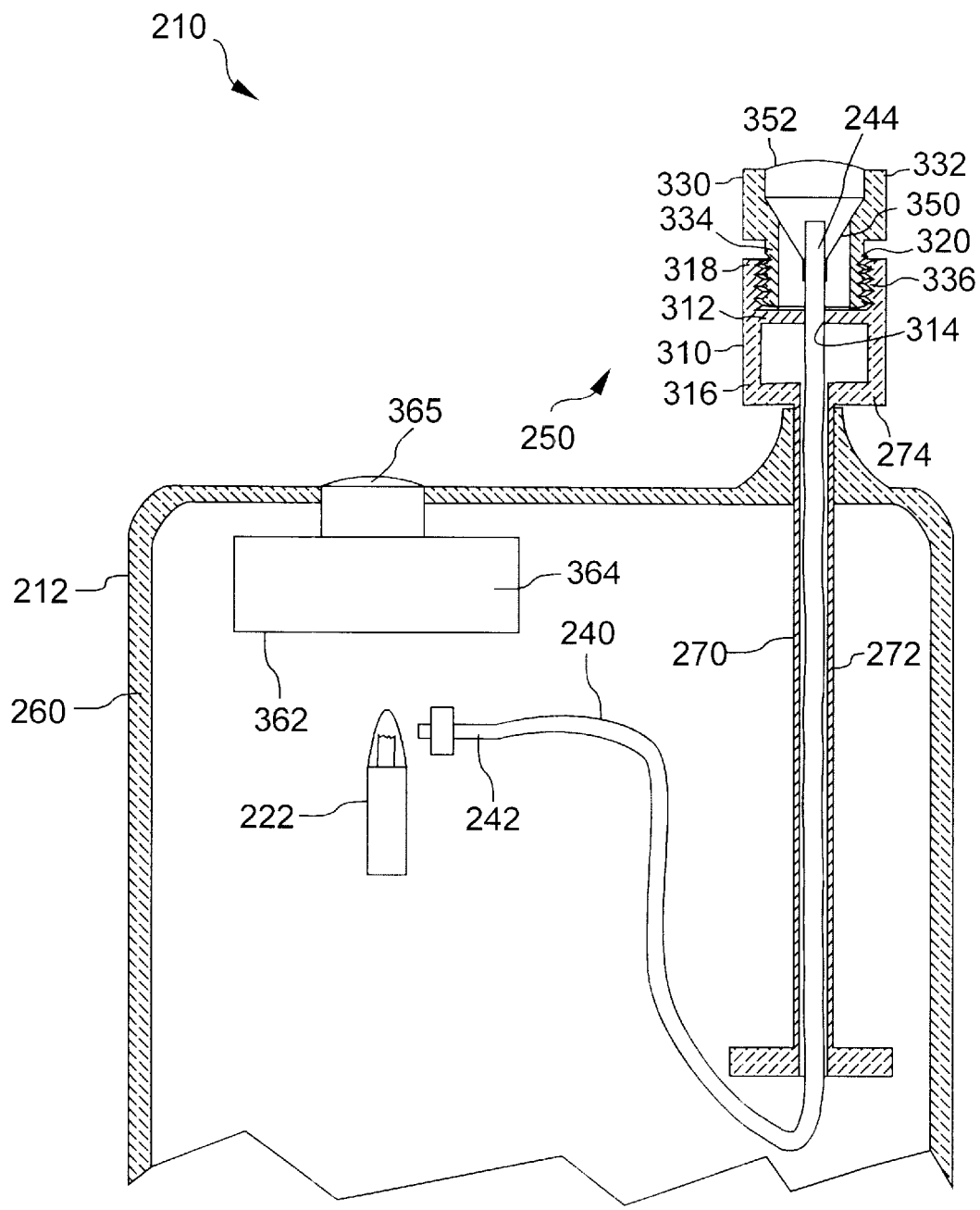
FIG. 6 is a partial cross sectional view of a portion of the embodiment of FIG. 4 with the cordless telephone antenna retracted.

Referring now to FIGS. 5–6, a fiber optic lead 240 includes a first end 242 adjacent to display light 222 and a second end 244 within a light source 250. Thus, fiber optic lead 240 transports light from display light 222 to a light source 250, where the light exits apparatus 210. An optical switch 252 is connected to light button 232 so that light will only be transported by fiber optic lead 240 if optical switch 252 is in an on position (see FIG. 7). Optical switch 252 may be a switch that moves fiber optic lead 240 so that it is not adjacent to display light 222 in an off position, or it may be a switch that otherwise blocks the flow of light between display light 222 and second end 252 of fiber optic lead 240.

Referring to FIGS. 4–7, telephone 212 includes a case. An information display screen or display 262, a microphone 264, a speaker 266, and an antenna 270 are all mounted on case 260. Antenna 270 preferably includes a shaft 272 that extends upwardly from case 260 and a knob 274 extending radially outwardly from a terminus of shaft 272 distal from case 260. Knob 274 is preferably integral with light source 250. Fiber optic lead 240 preferably extends from first end 242 upwardly through shaft 272 of antenna 270. Antenna 270 is moveable between an extended position shown in FIG. 5 and a retracted position shown in FIG. 6.

Referring now to FIGS. 5–6, light source 250 includes second end 244 of fiber optic lead 240 that is preferably fixed within a stationary housing 310. Stationary housing 310 preferably includes a radial wall 312 that defines an aperture 314. A lower circumferential wall 316 extends downwardly from a periphery of radial wall 312 and joins knob 274 of antenna 270. An upper circumferential wall 318 extends upwardly from the periphery of radial wall 312 and includes inwardly-facing threads or engaging members 320. Stationary housing 310 is preferably made from a stiff material such as a stiff polymer or a metal.

Light source 250 also includes a tubular mobile housing 330 that includes an upper circumferential wall 332 and a lower circumferential wall 334. Upper circumferential wall 332 preferably has a larger outer radius than does lower circumferential wall 334. Lower circumferential wall 334 includes outwardly-facing threads or engaging members 336 that mate with inwardly-facing threads 336 of stationary housing 310. Mobile housing 330 is preferably made from a stiff material such as a stiff polymer or metal.

Light source 250 also includes second end 244 of fiber optic lead 240 that is fixed within aperture 314 of stationary housing 310. Second end 244 of fiber optic lead 240 may be fixed within aperture 314 by an adhesive or other suitable fastener. Second end 244 emits light that is transported from display light 222. A reflector 350 and a lense or exit 352 are mounted within upper circumferential wall 332 of mobile housing 330. Second end 244 of fiber optic lead 240 extends upwardly through an opening in reflector 350 so that the terminus of second end 244 is located above or within reflector 350.

Figure 7:
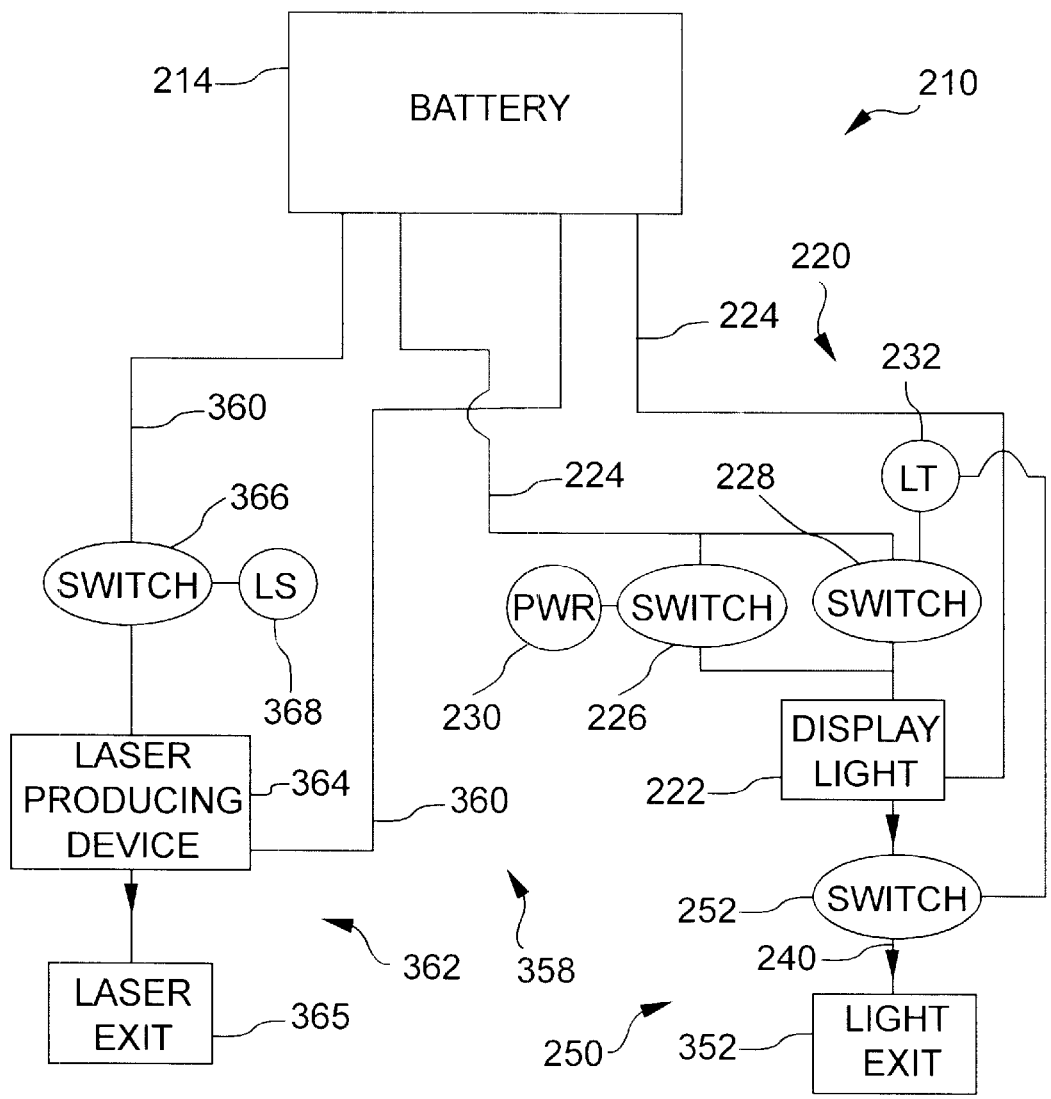
FIG. 7 is a schematic view of the light sources, switches, and battery according to the embodiment of FIG. 4.

Referring to FIGS. 5–7, apparatus 210 preferably also includes a laser circuit 358 that includes electrical leads 360 that extend from battery 214 to a laser source 362. Laser source 362 is preferably mounted within case 260 of telephone 212. Laser source 362 preferably includes a laser producing device 364 and a laser exit or lense 365. Laser producing device 364 can be any of several well known types of laser producing devices such as those used in conventional laser pointers. Laser circuit 358 preferably also includes a laser switch 366 that is actuated by depressing a laser button 368.

Preferably, apparatus 210 is sold as a single unit that is manufactured together according to known manufacturing methods. It should be noted that the present invention will produce advantages with an apparatus similar to apparatus 210 that is configured differently. For example, the laser source may be mounted on the antenna while the non-laser light source may be mounted directly within the telephone case.

In operation, a user depresses light button 232 to close light switch 228 and to turn on optical switch 252, thereby activating display light 222 of light source 250. Fiber optic lead 240 then transports light from display light 222 to second end 244 of fiber optic lead 240. The light is directed by reflector 350 through lense or exit 352. To adjustably focus the emitted light, a user rotates mobile housing 330 to move it upwardly or downwardly, thereby moving reflector 350 and lense 352 relative to second end 244 of fiber optic lead 240. To deactivate light source 250, a user depresses light button 232, thereby opening light switch 228 and turning optical switch 252 off. Thereafter, light will not be transported from display light 222 to second end 244 of fiber optic lead 240 and display light 222 will only be on if main power switch 226 is closed.

The embodiments described above provide a convenient and reliable source of laser and/or non-laser light by incorporating laser and/or non-laser light sources into a conventional cordless telephone. Such light sources are particularly useful because many people currently carry their cordless telephones almost everywhere they go. Accordingly, they will have a laser pointer and/or a flashlight in almost any situation where these light sources might be needed.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
    a power source adapted to be attached to a cordless electronic communication device;
    a light source adapted to be mounted on the cordless electronic communication device, the light source directing light away from the cordless electronic communication device without passing such light through an information display;
    a directly manipulatable on/off switch adapted to be mounted on the cordless electronic communication device, the switch operable to electrically connect the light source to the power source;
    wherein the light source is not a laser source and is not operably associated with information transmitted to or from the cordless electronic communication device; and
    wherein the power source is separate from the power source for operating the electronic device.

2. The apparatus of claim 1, wherein the power source comprises the power source for operating the cordless electronic device.

3. The apparatus of claim 1, wherein the power source comprises a battery.

4. The apparatus of claim 1, wherein the cordless electronic device comprises a cordless telephone, the cordless telephone having at least one outwardly directed light source that does not pass light through an information display.

5. The apparatus of claim 1, wherein the on/off switch connected to the light source is separate from an on/off switch for operating the cordless electronic device.

6. An apparatus comprising:
    a power source comprising a primary internal power source for operating a cordless telephone;
    a first light source mounted on the cordless telephone, the first light source directing light away from the cordless telephone without passing such light through an information display;
    a first directly manipulatable on/off switch adapted to be mounted on the cordless telephone, the first on/off switch operable to electrically connect the first light source to the power source;
    wherein the first light source is not a laser light source, and is not dependent on transmission of information to or from the telephone; and
    wherein at least a portion of the first light source is mounted on an antenna of the cordless telephone.

7. The apparatus of claim 6, wherein the first light source comprises a fiber optic lead directing light from an information display screen light source of the cordless telephone.

8. The apparatus of claim 6, wherein the first light source comprises a bulb mounted on the antenna.

9. The apparatus of claim 6, wherein the portion of the first light source mounted on the antenna is connected to the power source by a lead extending through the antenna.

10. The apparatus of claim 6, wherein the first on/off switch connected to the first light source is separate from an on/off switch for operating the cordless telephone.

11. The apparatus of claim 6, further comprising a mechanism for adjustably focusing the light from the first light source.

12. An apparatus comprising:
    a first power source comprising a battery;
    a second power source for operating a cordless telephone;
    a light source mounted on the cordless telephone, the light source directing light away from the cordless telephone without passing such light through an information display;
    a directly manipulatable on/off switch adapted to be mounted on the cordless telephone, the switch operable to electrically connect the light source to the first power source;
    wherein the light source is not a laser light source and is not dependent of information transmission to or from the cordless telephone; and
    wherein the light source comprises a bulb mounted externally on the cordless telephone.

13. The apparatus of claim 12, wherein the bulb is mounted on an antenna of the cordless telephone.

14. The apparatus of claim 13, wherein an electrical lead extends from the bulb to the battery, and wherein the battery is mounted externally on the cordless telephone.

15. The apparatus of claim 14, wherein the on/off switch connected to the light source is adjacent the battery and separate from an on/off switch for operating the cordless telephone.

16. The apparatus of claim 15, further comprising a mechanism for adjustably focusing the light source.

17. An apparatus comprising:
    a power source adapted to be attached to a cordless electronic communication device;

a light source adapted to be mounted on the cordless electronic communication device, the light source directing light away from the cordless electronic communication device without passing such light through an information display;

a directly manipulatable on/off switch adapted to be mounted on the cordless electronic communication device, the switch operable to electrically connect the light source to the power source;

wherein the light source is not a laser source and is not operably associated with information transmitted to or from the cordless electronic communication device; and further comprising a mechanism for adjustably focusing the light source.

18. An apparatus comprising:

a power source adapted to be attached to a cordless electronic communication device;

a light source adapted to be mounted on the cordless electronic communication device, the light source directing light away from the cordless electronic communication device without passing such light through an information display;

a directly manipulatable on/off switch adapted to be mounted on the cordless electronic communication device, the switch operable to electrically connect the light source to the power source;

wherein the light source is not a laser source and is not operably associated with information transmitted to or from the cordless electronic communication device; and wherein the at least one light source comprises a fiber optic lead directing light from an information display screen light source of the cordless electronic device.

19. An apparatus comprising:

a power source adapted to be attached to a cordless electronic communication device;

a light source adapted to be mounted on the cordless electronic communication device, the light source directing light away from the cordless electronic communication device without passing such light through an information display;

a directly manipulatable on/off switch adapted to be mounted on the cordless electronic communication device, the switch operable to electrically connect the light source to the power source;

wherein the light source is not a laser source and is not operably associated with information transmitted to or from the cordless electronic communication device;

wherein at least a portion of the light source is mounted on an antenna of the cordless electronic communication device.

20. An apparatus comprising:

a power source adapted to be attached to a cordless electronic communication device;

a light source adapted to be mounted on the cordless electronic communication device, the light source directing light away from the cordless electronic communication device without passing such light through an information display;

a directly manipulatable on/off switch adapted to be mounted on the cordless electronic communication device, the switch operable to electrically connect the light source to the power source;

wherein the light source is not a laser source and is not operably associated with information transmitted to or from the cordless electronic communication device; and wherein the light source comprises a bulb mounted externally on the cordless electronic device.

21. An apparatus comprising:

a power source adapted to be attached to a cordless electronic communication device;

a light source adapted to be mounted on the cordless electronic communication device, the light source directing light away from the cordless electronic communication device without passing such light through an information display;

a directly manipulatable on/off switch adapted to be mounted on the cordless electronic communication device, the switch operable to electrically connect the light source to the power source;

wherein the light source is not a laser source and is not operably associated with information transmitted to or from the cordless electronic communication device; and wherein the light source is a first light source, the apparatus further comprising a second light source comprising a laser light source.

22. An apparatus comprising:

a power source comprising a primary internal power source for operating a cordless telephone;

a first light source mounted on the cordless telephone, the first light source directing light away from the cordless telephone without passing such light through an information display;

a first directly manipulatable on/off switch adapted to be mounted on the cordless telephone, the first on/off switch operable to electrically connect the first light source to the power source;

wherein the first light source is not a laser light source, and is not dependent on transmission of information to or from the telephone; and wherein the apparatus further comprises:
a second light source that is a laser light source, the second light source adapted to be mounted on the cordless telephone; and
a second directly manipulatable on/off switch adapted to be mounted on the cordless telephone, the second on/off switch operable to electrically connect the second light source to the power source.

* * * * *